(12) United States Patent
Zhang et al.

(10) Patent No.: US 11,886,969 B2
(45) Date of Patent: Jan. 30, 2024

(54) DYNAMIC NETWORK BANDWIDTH IN DISTRIBUTED DEEP LEARNING TRAINING

(71) Applicant: International Business Machines Corporation, Armonk, NY (US)

(72) Inventors: Wei Zhang, Elmsford, NY (US); Xiaodong Cui, Chappaqua, NY (US); Abdullah Kayi, Westchester, NY (US); Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 16/925,192

(22) Filed: Jul. 9, 2020

(65) Prior Publication Data

US 2022/0012642 A1 Jan. 13, 2022

(51) Int. Cl.
*G06N 20/20* (2019.01)
*H04L 12/24* (2006.01)
*G06N 3/02* (2006.01)
*H04L 41/16* (2022.01)

(52) U.S. Cl.
CPC ............... *G06N 20/20* (2019.01); *G06N 3/02* (2013.01); *H04L 41/16* (2013.01)

(58) Field of Classification Search
CPC .......... G06N 20/20; G06N 3/02; G06N 3/063; G06N 3/08; G06N 3/0454; H04L 41/16; H04L 41/0896
See application file for complete search history.

(56) References Cited

U.S. PATENT DOCUMENTS

| 8,695,009 | B2 | 4/2014 | Vojnovic |
| 9,939,792 | B2 | 4/2018 | Chen et al. |
| 10,963,300 | B2 | 3/2021 | Champigny |
| 11,243,814 | B2 | 2/2022 | Shen |
| 11,461,213 | B2 | 10/2022 | Agrawal |
| 2011/0247003 | A1 | 10/2011 | Fong et al. |

(Continued)

FOREIGN PATENT DOCUMENTS

| CN | 104598972 A | 5/2015 |
| CN | 109492753 A | 3/2019 |

(Continued)

OTHER PUBLICATIONS

Jayarajan, A., "Priority-based parameter propagation for distributed deep neural network training", Aug. 2019, 50 pages.

(Continued)

*Primary Examiner* — Abdullahi E Salad
(74) *Attorney, Agent, or Firm* — Donald J. O'Brien

(57) ABSTRACT

Embodiments of a method are disclosed. The method includes performing distributed deep learning training on a batch of training data. The method also includes determining training times representing an amount of time between a beginning batch time and an end batch time. Further, the method includes modifying a communication aspect of the communication straggler to reduce a future network communication time for the communication straggler to send a future result of the distributed deep learning training on a new batch of training data in response to the centralized parameter server determining that the learner is the communication straggler.

14 Claims, 4 Drawing Sheets

(56) References Cited

U.S. PATENT DOCUMENTS

| | | | |
|---|---|---|---|
| 2016/0103901 A1* | 4/2016 | Kadav | G06F 9/46 707/614 |
| 2017/0091668 A1 | 3/2017 | Kadav et al. | |
| 2018/0129969 A1* | 5/2018 | Feng | G06N 20/20 |
| 2018/0253646 A1 | 9/2018 | Feng et al. | |
| 2018/0293463 A1 | 10/2018 | Brown | |
| 2018/0300171 A1 | 10/2018 | Qiao | |
| 2019/0042934 A1 | 2/2019 | Arunachalam et al. | |
| 2019/0155620 A1* | 5/2019 | Arunachalam | G06N 3/04 |
| 2019/0171935 A1* | 6/2019 | Agrawal | G06N 3/08 |
| 2020/0042362 A1 | 2/2020 | Cui et al. | |
| 2020/0104127 A1 | 4/2020 | Grover | |
| 2020/0184320 A1* | 6/2020 | Croxford | G06N 3/063 |
| 2020/0387777 A1 | 12/2020 | Avestimehr | |
| 2021/0034374 A1* | 2/2021 | Saxena | G06F 9/544 |
| 2021/0133555 A1 | 5/2021 | Qiu | |
| 2021/0176174 A1 | 6/2021 | Chou | |
| 2021/0194831 A1 | 6/2021 | Huang | |
| 2022/0004933 A1 | 1/2022 | Gu | |
| 2022/0012584 A1 | 1/2022 | Zhang | |
| 2022/0012629 A1 | 1/2022 | Zhang | |
| 2022/0012642 A1 | 1/2022 | Zhang | |
| 2023/0012487 A1 | 1/2023 | Makaya | |
| 2023/0068386 A1 | 3/2023 | Akdeniz | |
| 2023/0145437 A1 | 5/2023 | Costa | |

FOREIGN PATENT DOCUMENTS

| | | |
|---|---|---|
| CN | 110659745 A | 1/2020 |
| WO | 2019183195 A1 | 9/2019 |

OTHER PUBLICATIONS

Luo et al., "Parameter Hub: A Rack-Scale Parameter Server for Distributed Deep Neural Network Training", May 21, 2018, 15 pages.

Yu et al., "GradiVeQ: Vector Quantization for Bandwidth-Efficient Gradient Aggregation in Distributed CNN Training", 32nd Conference on Neural Information Processing Systems, Dec. 31, 2018, 12 pages.

Lin et al., "Deep Gradient Compression: Reducing the Communication Bandwidth for Distributed Training", Feb. 16, 2018, 14 pages.

Chen et al., "AdaComp: Adaptive Residual Gradient Compression for Data-Parallel Distributed Training", The Thirty-Second AAAI Conference on Artificial Intelligence (AAAI-18), 2018, pp. 2827-2835.

Chen et al., "Fast Distributed Deep Learning via Worker-adaptive Batch Sizing", SoCC '18, Oct. 11-13, 2018, 1 page.

Jiang et al., "Heterogeneity-aware Distributed Parameter Servers", SIGMOD'17, May 14-19, 2017, pp. 463-478.

Chen et al., "Revisiting distributed synchronous SGD", Mar. 21, 2017, pp. 1-10.

Yao et al., "FluentPS: A Parameter Server Design with Low-frequency Synchronization for Distributed Deep Learning", Conference Paper—Sep. 2019, 12 pages.

Yang et al., "An adaptive batch-orchestration algorithm for the heterogeneous GPU cluster environment in distributed deep learning system", 2018 IEEE International Conference on Big Data and Smart Computing, pp. 725-728.

Basu et al., "Balancing stragglers against staleness in distributed deep learning", 2018 IEEE 25th International Conference on High Performance Computing (HiPC), pp. 12-21.

Zhang et al., "Dynamic Computation Rates for Distributed Deep Learning", U.S. Appl. No. 16/925,161, filed Jul. 9, 2020.

Zhang et al., "Dynamic Computation in Decentralized Distributed Deep Learning Training", U.S. Appl. No. 16/925,178, filed Jul. 9, 2020.

IBM, List of IBM Patents or Patent Applications Treated as Related, Jun. 17, 2020, 2 pages.

Harlap, Aaron, et al. "Addressing the straggler problem for iterative convergent parallel ML." Proceedings of the seventh ACM symposium on cloud computing. 2016. (Year: 2016).

Lian, Xiangru, et al. "Can Decentralized Algorithms Outperform Centralized Algorithms? A Case Study for Decentralized Parallel Stochastic Gradient Descent." arXiv preprint arXiv:1705.09056 (2017). (Year: 2017).

U.S. Appl. No. 16/925,178 Notice of References Cited, dated Aug. 30, 2023, 1 pg.

Amiri et al., "Computation Scheduling for Distributed Machine Learning with Straggling Workers" May 23, 2019, arXiv: 1810.09992v3, pp. 1-13. (Year: 2019).

Behrouzi-Far et Soljanin, "Efficient Replication for Straggler Mitigation in Distributed Computing" Jun. 3, 2020, arXiv: 2006.02318v1, pp. 1-19. (Year: 2020).

Bitar et al., "Stochastic Gradient Coding for Straggler Mitigation in Distributed Learning" May 14, 2019, arXiv: 1905.05383v1, pp. 1-23. (Year: 2019).

Dutta et al., "Slow and Stale Gradients Can Win the Race: Error-Runtime Trade-offs in Distributed SGD" 2018, pp. 1-10. (Year: 2018).

Ferdinand et al., "Anytime Minibatch: Exploiting Stragglers in Online Distributed Optimization" Jun. 10, 2020, arXiv: 2006.05752v1, pp. 1-26. (Year: 2020).

Geng et al., "Elastic Pipe: An Efficient and Dynamic Model-Parallel Solution to DNN Training" Jun. 25, 2019, pp. 5-9. (Year: 2019).

Geng et al., "Fela: Incorporating Flexible Parallelism and Elastic Tuning to Accelerate Large-Scale DML" May 27, 2020, pp. 1393-1404. (Year: 2020).

Hoi et al., "Online Feature Selection for Mining Big Data" Aug. 12, 2012, pp. 93-100. (Year: 2012).

Mallick et al., "Rateless Codes for Near-Perfect Load Balancing in Distributed Matrix-Vector Multiplication" Oct. 30, 2019, arXiv: 1804.10331v5, pp. 1-40. (Year: 2019).

Narra et al., "Slack Squeeze Coded Computing for Adaptive Straggler Mitigation" Nov. 2019, pp. 1-16. (Year: 2019).

Ozfatura et al., "Age-Based Coded Computation for Bias Reduction in Distributed Learning" Jun. 2, 2020, arXiv: 2006.01816v1, pp. 1-6. (Year: 2020).

U.S. Appl. No. 16/925,161, Notice of References Cited, mailed May 10, 2023.

Yang et al., "BOA: batch orchestration algorithm for straggler mitigation of distributed DL training in heterogeneous GPU cluster" Apr. 16, 2019, pp. 47-67. (Year: 2019).

Yu et al., "Entangled Polynomial Codes for Secure, Private, and Batch Distributed Matrix Multiplication: Breaking the Cubic Barrier" Apr. 13, 2020, arXiv: 2001.05101v2, pp. 1-14. (Year: 2020).

Yu et al., "Layered SGD: A Decentralized and Synchronous SGD Algorithm for Scalable Deep Neural Network Training" Jun. 13, 2019, arXiv: 1906.05936v1, pp. 1-7. (Year: 2019).

Zhang et Simeone, "LAGC: Lazily Aggregated Gradient Coding for Straggler-Tolerant and Communication-Efficient Distributed Learning" Apr. 8, 2020, arXiv: 1905.09148v2, pp. 1-24. (Year: 2020).

Zhou et al., "Falcon: Towards Computation-Parallel Deep Learning in Heterogeneous Parameter Server" 2019, pp. 196-206. (Year: 2019).

Cai et al., "D2D-Enabled Data Sharing for Distributed Machine Learning at Wireless Network Edge" Jan. 28, 2020, arXiv: 2001.11342v1, pp. 1-5. (Year: 2020).

Chaudhary et al., "Balancing Efficiency and Fairness in Heterogeneous GPU Clusters for Deep Learning" Apr. 2020, pp. 1-16. (Year: 2020).

Guo et al., "Efficient Gradient Descent via Value Staleness Analysis for Heterogeneous Deep Learning Systems" 2019, pp. 31-36. (Year: 2019).

Hanna et al., "Adaptive Distributed Stochastic Gradient Descent for Minimizing Delay in the Presence of Stragglers" Feb. 25, 2020, arXiv: 2002.11005v1, pp. 1-5. (Year: 2020).

Ilager et al., "A Data-Driven Frequency Scaling Approach for Deadline-aware Energy Efficient Scheduling on Graphics Processing Units (GPUs)" Apr. 28, 2020, arXiv: 2004.08177v2, pp. 1-10. (Year: 2020).

(56) References Cited

OTHER PUBLICATIONS

Jiang et al., "Heterogeneity-aware Distributed Parameter Servers" May 2017, pp. 1-16. (Year: 2017).
Koliousis et al., "Crossbow: Scaling Deep Learning with Small Batch Sizes on Multi-GPU Servers" Jan. 8, 2019, arXiv: 1901.02244v1, pp. 1-14. (Year: 2019).
Mo, X. et al "Energy-Efficient Federated Edge Learning with Joint Communication and Computation Design" Feb. 29, 2020, arXiv: 2003.00199v1, pp. 1-28. (Year: 2020).
Notices of References, U.S. Appl. No. 16/925,161, dated Oct. 12, 2023, 3 pgs.
Saxena et al., "Effective Elastic Scaling of Deep Learning Workloads" Jun. 24, 2020, arXiv: 2006.13878v1, pp. 1-15. (Year: 2020).
Wang et al., "Communication Contention Aware Scheduling of Multiple Deep Learning Training Jobs" Feb. 24, 2020, arXiv: 2002.10105v1, pp. 1-12. (Year: 2020).
Zheng et al., "Cynthia: Cost-Efficient Cloud Resource Provisioning for Predictable Distributed Deep Neural Network Training" Aug. 2019, pp. 1-11. (Year: 2019).

\* cited by examiner

DYNAMIC NETWORK BANDWIDTH IN DISTRIBUTED DEEP LEARNING TRAINING

BACKGROUND

The present disclosure relates to distributed deep learning, and more specifically, to dynamic network bandwidth in distributed deep learning.

Deep learning is a technological field that represents a subset of machine learning. In deep learning, neural networks learn from relatively large amounts of data. Neural networks can be algorithms designed to learn in a manner similar to learning in the human brain. In deep learning, a classification task is performed repeatedly in order to gradually improve the accuracy of the classification. Such learning is possible due to multiple layers of computational logic that enable progressive learning.

Distributed deep learning refers to a computational architecture that performs these layers of computational logic in parallel by using multiple compute nodes. In this way, distributed deep learning can improve the speed with which deep learning systems learn.

SUMMARY

Embodiments of a method are disclosed. The method includes performing distributed deep learning training on a batch of training data. The method also includes determining training times representing an amount of time between a beginning batch time and an end batch time. Further, the method includes modifying a communication aspect of the communication straggler to reduce a future network communication time for the communication straggler to send a future result of the distributed deep learning training on a new batch of training data in response to the centralized parameter server determining that the learner is the communication straggler.

Embodiments of a method are disclosed. The method includes identifying a communication straggler of multiple learners based on whether a network communication time of the communication straggler exceeds a threshold training time for the plurality of learners. The method also includes requesting the communication straggler to modify a communication aspect to reduce a future network communication time for the communication straggler to send a future result to a centralized parameter server.

Further aspects of the present disclosure are directed toward systems and computer program products with functionality similar to the functionality discussed above regarding the computer-implemented methods. The present summary is not intended to illustrate each aspect of every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
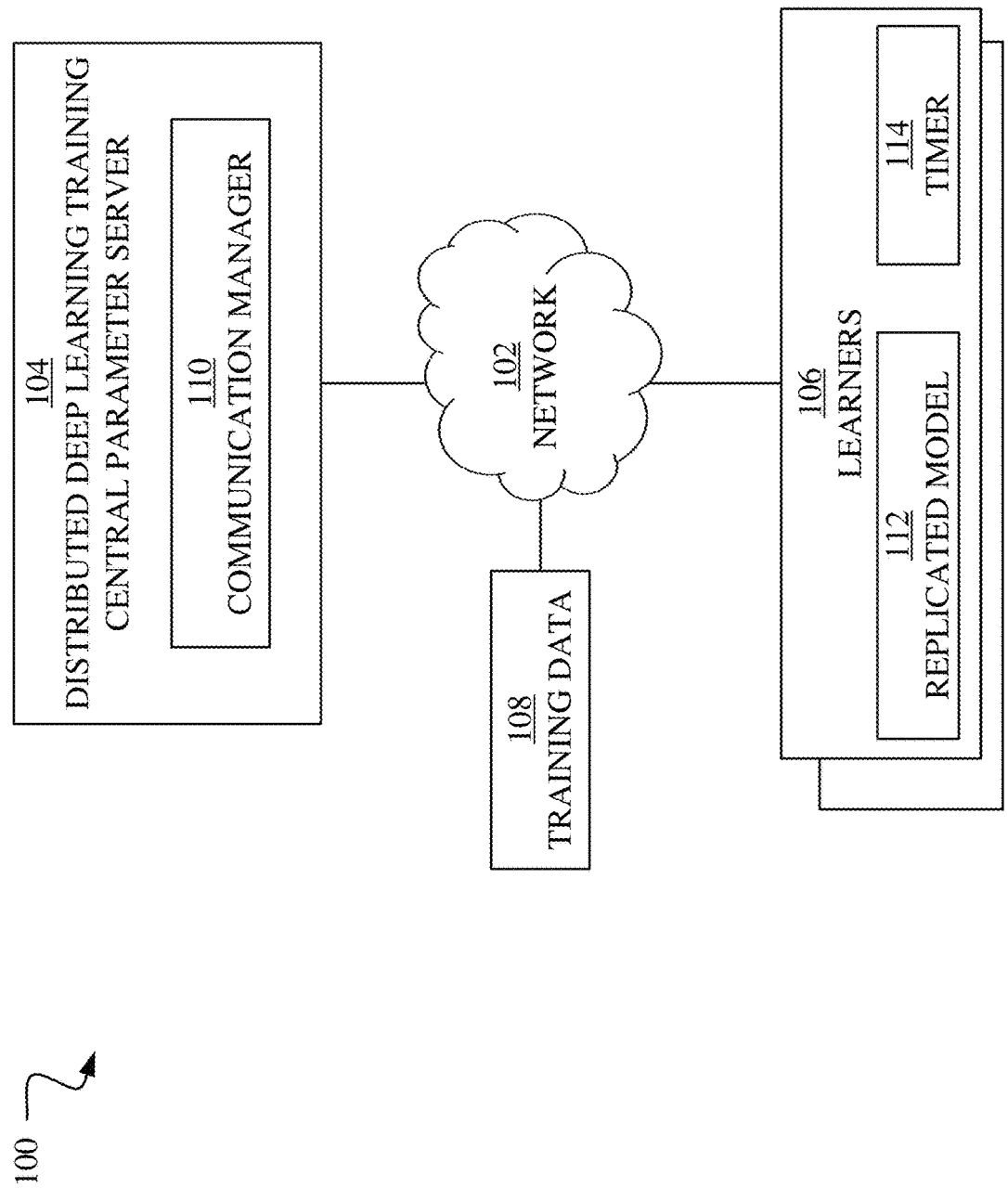
FIG. 1 is a block diagram of an example system for dynamic network bandwidth in distributed deep learning training, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Machine learning is a process wherein a computer algorithm is trained to make a specific classification. For example, machine learning algorithms (learners) can be trained to identify classes of objects in a digital photograph, predict a future shopping choice of a potential customer in a marketing database, and so on. However, training learners can be computationally expensive. In other words, training can involve relatively large numbers of computational decision-making. As such, training can take a relatively large amount of time, which may violate constraints on the relevance of the trained classification. For example, a future sale may be scheduled for a holiday weekend. Accordingly, training a machine learning algorithm to predict future shopping choices may not be relevant once the holiday weekend has passed. Thus, using distributed deep learning, it is possible to reduce the amount of time involved in training.

Distributed deep learning training reduces the amount of time involved in training by training a number of learners, in parallel, to perform different parts of the classification problem. Distributed deep learning training can involve either a central or decentralized control. The control can distribute training data to the learners, determine and adjust training parameters, coordinate the processing of training data, and the like. These controls can be synchronous or asynchronous. Synchronous control means that the training of the multiple learners is concurrent, or processed within an overlapping time period. Asynchronous control means that the training time periods may not overlap.

In this way, a centralized synchronous distributed deep learning training approach can be a useful solution for finding solutions to classifications and convergence in machine learning. However, this approach may not be time efficient because of the communication straggler problem. The communication straggler problem refers to scenarios where slow learners can use a disproportionate amount of the overall clock time of the training, according to Amdahl's Law. In this way, the centralized control can represent a single point of failure because the centralized control may wait until all learners have finished before performing the centralized processing. Additionally, synchronous collective communication can result in hot spots and accordingly performance degradation due to bandwidth issues between the learners and the central control.

Accordingly, some embodiments of the present disclosure can dynamically improve the performance of a distributed training cluster with imbalanced limited bandwidth. Some embodiments may involve identifying whether the work (performance bottleneck) can be overlapped during the operation on an imbalanced connection. If not, such embodiments can involve increasing the effective bandwidth on the connection by compressing the communications.

FIG. 1 is a block diagram of an example system 100 for dynamic network bandwidth in distributed deep learning training, in accordance with some embodiments of the present disclosure. The system 100 includes a network 102, distributed deep learning training central parameter server 104, learners 106, and training data 108.

The distributed deep learning training central parameter server 104 can perform distributed deep learning training by coordinating the processing of multiple batches of training data 108 to train learners 106 in parallel. The training data 108 can be multiple records that the learners 106 classify. Additionally, the training data 108 can include labels that indicate the correct classifications. In this way, the learners 106 can determine when their classifications are correct. Accordingly, the learners 106 can adjust specific parameters used to make the classifications based on whether classifications are correct. These parameters are also referred to herein as weights and gradients.

More specifically, the distributed deep learning training central parameter server 104 can distribute the training data 108 to the learners 106, along with a centrally determined weight for the learner 106. Once the learners 106 adjust the gradients based on the correctness of their classifications, the distributed deep learning training central parameter server 104 can centrally process the individual gradients to determine a new weight for the next batch of training data.

Additionally, the distributed deep learning training central parameter server 104 can include a communication manager 110. The communication manager 110 can identify communication stragglers in the learners 106 based on the amount of time between when the learners 106 send the output for each batch of processed training data 108 to the distributed deep learning training central parameter server 104 and when the output arrives. The amount of time it takes for the communication to pass between the learners 106 and the distributed deep learning training central parameter server 104 (network communication time) can represent a bottleneck when the one or more network communication times exceed a predetermined threshold, outside a standard deviation, as some examples.

More specifically, the communication manager 110 can dynamically improve performance in a distributed training cluster, such as represented by a system 100 with imbalanced, limited bandwidth over physical network connections. In such embodiments, the communication manager 110 can determine if there is a communication bottleneck based on the network communication times. Communication bottlenecks can reduce the amount of overlap in distributed deep learning training, thus reducing its efficiency. Accordingly, the communication manager 110 can determine whether the work performed by the learners 106 can be more overlapped even though some of the learners 106 are communicating over networks that have less bandwidth than other network connections in the system 100. The communication manager 110 can identify network communication times that exceed predetermined thresholds, for example, and indicate the learner 106 compress future communications to the distributed deep learning training central parameter server 104. In this way, the communication manager 110 and learner 106 can increase the effective bandwidth on the slower connection(s) by compressing the data to transfer. Further, compression rates can vary based on the size of any imbalance over the different network connections. In some example distributed deep learning models, gradient compression rates can range from 100-times (100×) to 10000×.

The learners 106 can include a replicated model 112 and a timer 114. The replicated model 112 can be a machine learning model that the learner 106 uses to make the classification. The replicated model 112 can be replicated across each of the learners 106. The timer 114 can track the amount of training time for the learner 106 to process each batch of training data 108.

In some embodiments, communication stragglers may also be repeat offenders. In other words, the communication manager 110 may identify communication stragglers as learners 106 that exceed the predetermined threshold for multiple batches of training data 108. Accordingly, the distributed deep learning training central parameter server 104 may reduce the amount of training data 108 for the communication stragglers. Further, the distributed deep learning training central parameter server 104 can distribute the reduced number of training data 108 records to the remaining learners 106. In this way, the communication straggler can reduce the amount of time performing the training by reducing the number of training data 108 records processed.

In some embodiments, the communication manager 110 can adjust the frequency rate of a computational processor of the communication straggler. By increasing the frequency rate, the communication manager 110 can reduce the amount of time that the communication straggler takes to process the training data 108 without reducing the number of training data 108 records. In some embodiments, the communication manager 110 can perform some combination of reducing training data 108 records and increasing the frequency rate of the communication straggler. In some embodiments, the communication manager 110 can reduce the frequency rate of all learners 106 but the communication straggler. In this way, the communication manager 110 balances the amount of training time by increasing the training time for the learners 106 that are not straggling.

Figure 2:
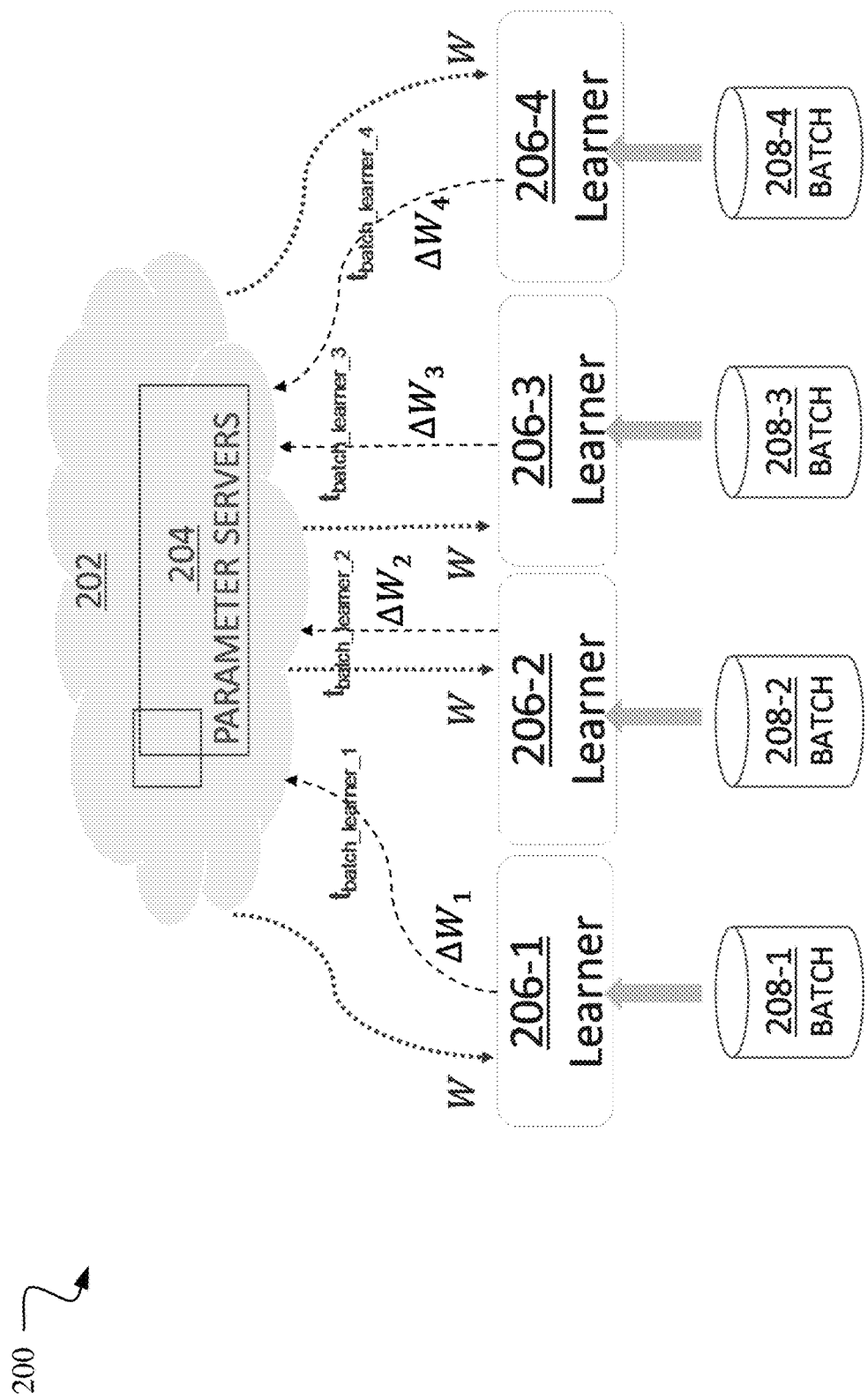
FIG. 2 is an example system for dynamic network bandwidth in distributed deep learning training, in accordance with some embodiments of the present disclosure.

FIG. 2 is an example system 200 for dynamic network bandwidth in distributed deep learning training, in accordance with some embodiments of the present disclosure. The system 200 includes a network 202, central parameter servers 204, learners 206, and training data batches 208. The network 202 can be similar to the network 102, described with respect to FIG. 1. Similarly, the centralized parameter server 204 can be similar to the distributed deep learning training central parameter server 104. Additionally, the learners 206 can be similar to the learners 106, and the training data batches 208 can be similar to the training data 108.

In some embodiments, the learners 206 can pull the weight W from central parameter servers 204 and compute the gradient ΔW using the batch size. The batch size can refer to the amount of training data in the training data batches 208. Additionally, the learners 206 can push the gradient back to the centralized parameter servers 204. The learners 206 can also time themselves for each training data batch 208 by recording start and end times, e.g., $\{t_{s1}, t_{e1} \ldots t_{sn}, t_{en}\}$, represents, respectively, time start of batch 1, time end of batch 1 . . . time start of batch n, time end of batch n. The learners 206 can send these time values as meta-data along with ΔW to the centralized parameter servers 204.

The centralized parameter servers 204 can wait until all the gradients from the learners 206 are received, aggregate the gradients, and update the weight, W. Additionally, the centralized parameter servers 204 can identify communication straggler(s) in the learners 206, notify the communication straggler(s), which can thus modify a communication aspect. The centralized parameter servers 204 can collect local batch execution times, $t_{batch\_learner\_1}$ through $t_{batch\_learner\_4}$, from the learners 206-1 through 206-4, respectively. Additionally, the centralized parameter servers 204 can use a central clock time along with the local batch execution time from each learner 106 to detect network related issues.

Modifying the communication aspect can involve compressing the communication packages to the centralized parameter servers 204 to reduce the size of the communication packages. In this way, the system 200 can reduce the network communication time by reducing the size of the communication between communication straggling learner(s) and the centralized parameter servers 204.

Some embodiments may modify a processing aspect, which can involve modifying the frequency rate of the processors of the communication straggler(s). For example, the frequency rate of the communication straggler's processor can be increased. Conversely, the frequency rate of the remaining learners 206 can be decreased.

Figure 3:
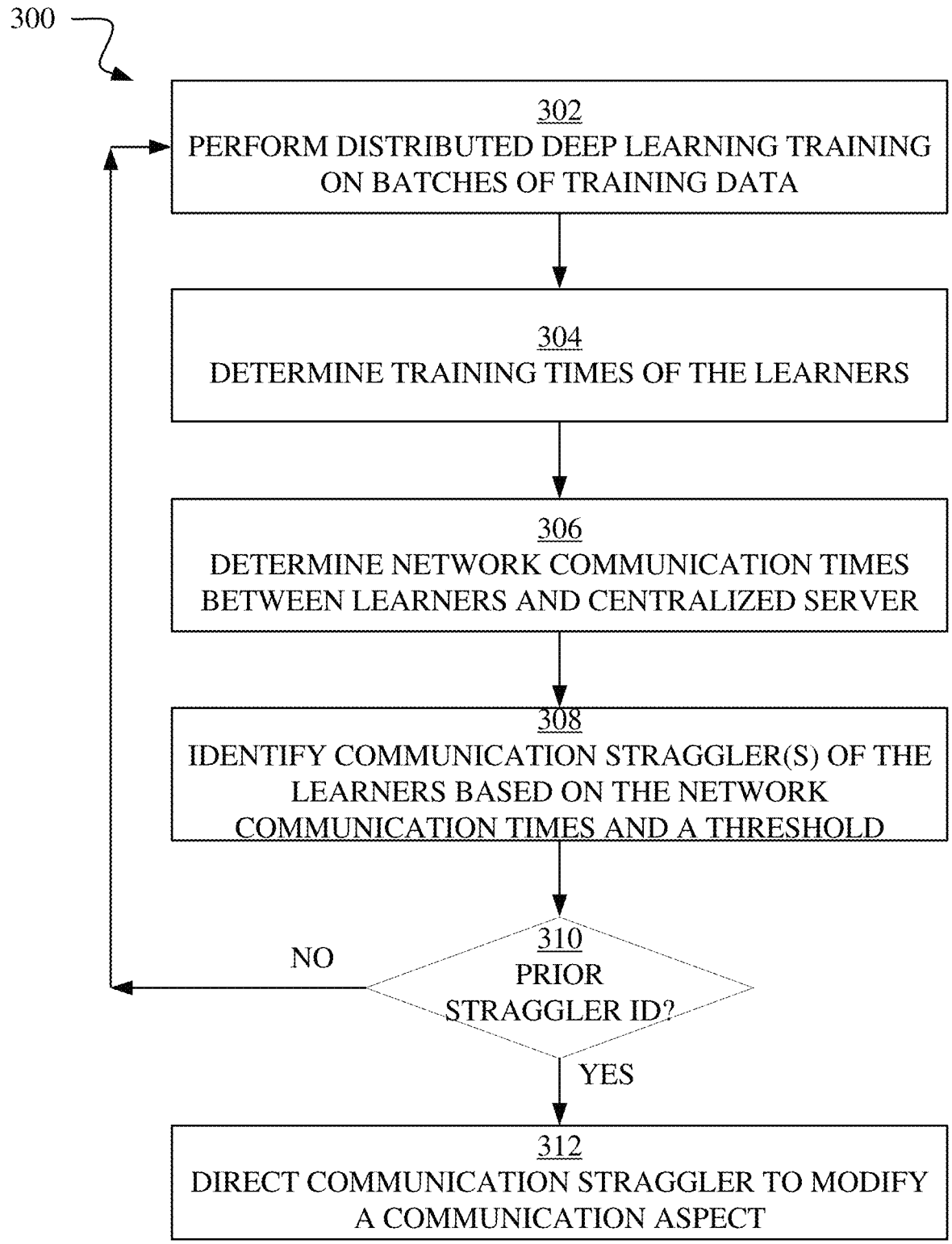
FIG. 3 is a process flow diagram of a method for dynamic network bandwidth in distributed deep learning training, in accordance with some embodiments of the present disclosure.

FIG. 3 is a process flow diagram of a method 300 for dynamic network bandwidth in distributed deep learning training, in accordance with some embodiments of the present disclosure. In some embodiments of the present disclosure, the learners 106 and the communication manager 110, described with respect to FIG. 1, may perform the method 300.

At operation 302, the learners 106 can perform distributed deep learning training on batches of training data, such as, the training data 108. Performing distributed deep learning training can involve performing classifications on each of the records on batches of training data 108. Additionally, distributed deep learning training can involve adjusting weights and gradients based on the correctness of the classifications.

At operation 304, the learners 106 can determine the training times of the learners 106 on the batches of training data 108. Determining the training times can involve identifying start and stop times between which each of the learners performs the processing for its batch of training data 108.

At operation 306, the communication manager 110 can determine the network communication times between the learners 106 and the distributed deep learning training central parameter server 104. Determining the network communication times can include comparing the batch end times to the time that the distributed deep learning training central parameter server 104 receives the results.

At operation 308, the distributed deep learning training central parameter server 104 can identify a communication straggler based on the table. The communication straggler can be a learner with a network communication time that exceeds a predetermined threshold time. Alternatively, the communication straggler can have a network communication time outside a threshold time. In some embodiments, the threshold time can be based on the standard deviation of the network communication times of all the learners.

At operation 310, the distributed deep learning central parameter server 104 can determine if the identified communication straggler has been previously identified as a communication straggler. More specifically, the communication manager 110 can perform this determination. In this way, the communication manager 110 can limit identified communication stragglers to those that exceed the predetermined threshold multiple times. Thus, if the identified communication straggler has no prior communication straggler identification, control may flow back to operation 302 for further training. However, if the identified communication straggler has a prior communication straggler identification, control may flow to operation 312.

At operation 312, the communication manager 110 can direct the communication straggler modify a processing aspect of the communication straggler. Modifying the communication aspect can involve the distributed deep learning training central parameter server 104 sending an active message to the communication straggler to compress data. This message can also include a compression ratio that the communication manager 110 determines based on the network communication times. In this way, the communication straggling learner can start compressing results, e.g., ΔW, for future transfers.

In some embodiments, the method 300 can include a control loop to balance learners 106 by detecting future imbalance cases and acting as described above. Additionally, in some embodiments, the method 300 can include a feedback loop to determine if there is a ping-pong effect on the same learner 106. The ping-pong effect can refer to a scenario where the same learner is repeatedly identified as a communication straggler and sped up, then not identified as a communication straggler and slowed down, repeatedly. In such a case, the feedback loop may stop the repeat identifications by keeping the ping-ponging learner in one category or the other, e.g., a communication straggler or non-communication straggler.

Figure 4:
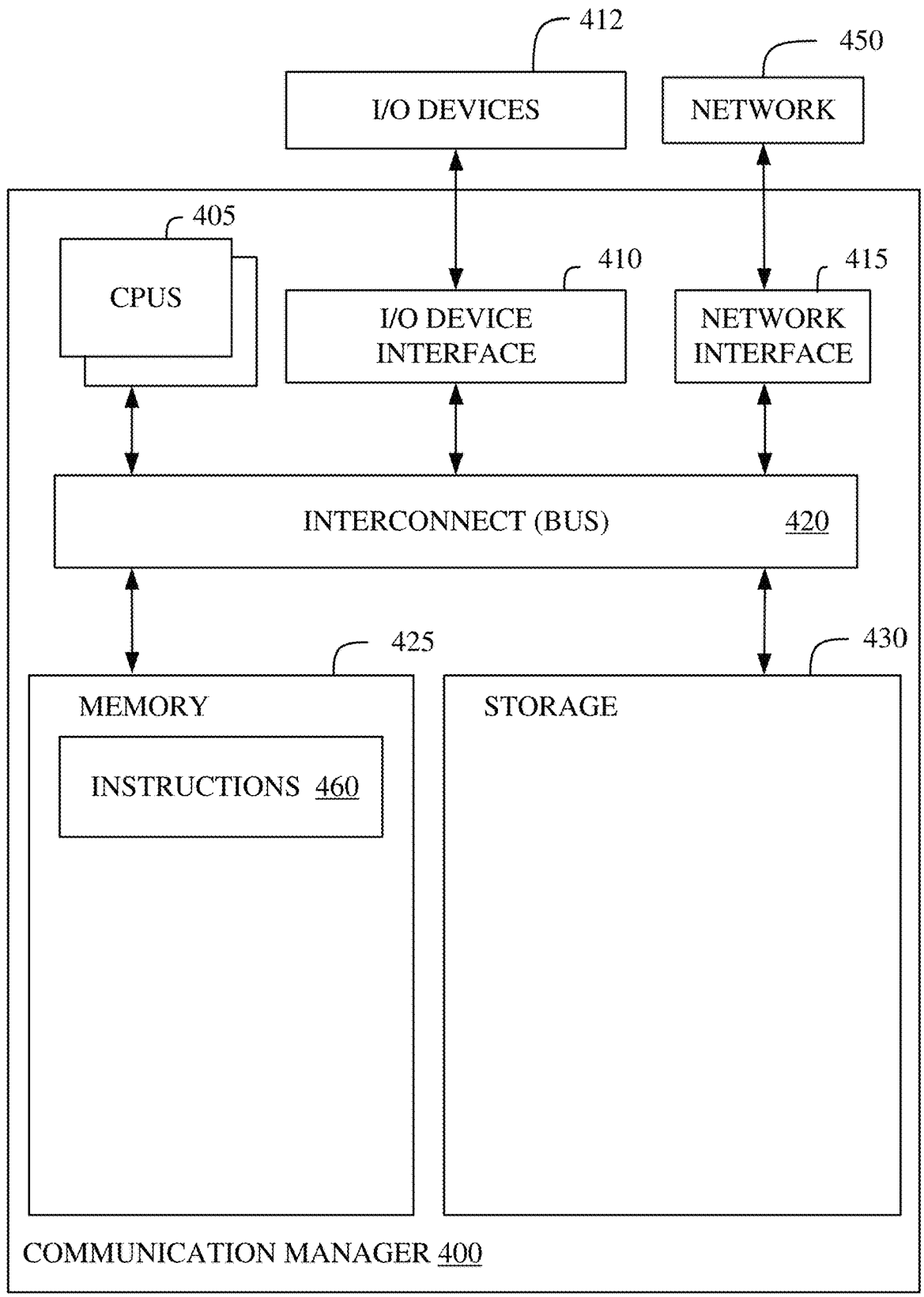
FIG. 4 is a block diagram of an example communication manager, in accordance with some embodiments of the present disclosure.

FIG. 4 is a block diagram of an example communication manager 400, in accordance with some embodiments of the present disclosure. In various embodiments, the communication manager 400 is similar to the communication manager 110 described with respect to FIG. 1, and can perform the method described in FIG. 3, and/or the functionality discussed in FIGS. 1 and 2. In some embodiments, the communication manager 400 provides instructions for the aforementioned methods and/or functionalities to a client machine such that the client machine executes the method, or a portion of the method, based on the instructions provided by the communication manager 400. In some embodiments, the communication manager 400 comprises software executing on hardware incorporated into a plurality of devices.

The communication manager 400 includes a memory 425, storage 430, an interconnect (e.g., BUS) 420, one or more CPUs 405 (also referred to as processors 405 herein), an I/O device interface 410, I/O devices 412, and a network interface 415.

Each CPU 405 retrieves and executes programming instructions stored in the memory 425 or the storage 430. The interconnect 420 is used to move data, such as programming instructions, between the CPUs 405, I/O device interface 410, storage 430, network interface 415, and memory 425. The interconnect 420 can be implemented using one or more busses. The CPUs 405 can be a single CPU, multiple CPUs, or a single CPU having multiple processing cores in various embodiments. In some embodiments, a CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of random access memory (e.g., static random access memory (SRAM), dynamic random access memory (DRAM), or Flash). The storage 430 is generally included to be representative of non-volatile memory, such as a hard disk drive, solid-state device (SSD), removable memory cards, optical storage, and/or flash memory devices. Additionally, the storage 430 can include storage area network (SAN) devices, the cloud, or other devices connected to the communication manager 400 via the I/O device interface 410 or to a network 450 via the network interface 415.

In some embodiments, the memory 425 stores instructions 460. However, in various embodiments, the instructions 460 are stored partially in memory 425 and partially in storage 430, or they are stored entirely in memory 425 or entirely in storage 430, or they are accessed over a network 450 via the network interface 415.

Instructions 460 can be processor-executable instructions for performing any portion of, or all, of the method described in FIG. 3, and/or the functionality discussed in FIGS. 1 and 2.

In various embodiments, the I/O devices 412 include an interface capable of presenting information and receiving input. For example, I/O devices 412 can present information to a listener interacting with communication manager 400 and receive input from the listener.

The communication manager 400 is connected to the network 450 via the network interface 415. Network 450 can comprise a physical, wireless, cellular, or different network.

In some embodiments, the communication manager 400 can be a multi-user mainframe computer system, a single-user system, or a server computer or similar device that has little or no direct user interface but receives requests from other computer systems (clients). Further, in some embodiments, the communication manager 400 can be implemented as a desktop computer, portable computer, laptop or notebook computer, tablet computer, pocket computer, telephone, smartphone, network switches or routers, or any other appropriate type of electronic device.

It is noted that FIG. 4 is intended to depict the major representative components of an exemplary communication manager 400. In some embodiments, however, individual components can have greater or lesser complexity than as represented in FIG. 4, components other than or in addition to those shown in FIG. 4 can be present, and the number, type, and configuration of such components can vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
    performing distributed deep learning training on a batch of training data;
    determining a training time representing an amount of time between:
        a beginning batch time for a learner; and
        an end batch time for the learner;
    determining that the learner is a communication straggler by determining that the training time exceeds a predetermined threshold time; and
    modifying a communication aspect of the learner to reduce a future network communication time for the communication straggler to send a future result of the distributed deep learning training on a new batch of training data in response to a centralized parameter server determining that the learner is the communication straggler, wherein modifying the communication aspect comprises compressing the future result before sending the future result to the centralized parameter server, wherein the future result is compressed using a compression rate based on a network communication time of the communication straggler.

2. The method of claim 1, further comprising:
    determining a plurality of network communication times representing an amount of time between:
        a plurality of batch end times; and
        a plurality of times when the centralized parameter server receives a plurality of results; and
    identifying the communication straggler based on the plurality of network communication times and a threshold network communication time.

3. The method of claim 1, further comprising modifying a processing aspect of the communication straggler, wherein modifying the processing aspect comprises:
    determining a size of the new batch of training data; and
    distributing a reduced amount of communication straggler training data to a plurality of remaining learners for performing the distributed deep learning training.

4. The method of claim 3, further comprising:
    performing the distributed deep learning training on the new batch of training data by the communication straggler; and
    performing the distributed deep learning training on the reduced amount of communication straggler training data by the plurality of remaining learners.

5. The method of claim 1, further comprising modifying a processing aspect of the communication straggler, wherein modifying the processing aspect comprises increasing a frequency rate of a computational processor of the communication straggler.

6. The method of claim 1, further comprising:
    performing the distributed deep learning training on a plurality of batches of training data using a plurality of learners;
    determining a plurality of training times representing an amount of time between:
        when the plurality of learners begin generating a corresponding plurality of results for the centralized parameter server for the distributed deep learning training; and
        when the plurality of learners send the plurality of results to the centralized parameter server; and
    determining a plurality of network communication times representing an amount of time between:
        when the plurality of learners send the plurality of results to the centralized parameter server for the distributed deep learning training; and
        when the centralized parameter server receives the plurality of results.

7. A computer program product comprising program instructions stored on a computer readable storage medium, the program instructions executable by a processor to cause the processor to perform a method comprising:
    a learner performing distributed deep learning training on a batch of training data;
    the learner determining a plurality of training times representing an amount of time between:
        a beginning batch time; and
        an end batch time;
    the learner determining that the learner is a communication straggler by determining that a training time of the learner exceeds a predetermined threshold time; and
    the learner modifying a communication aspect of the communication straggler to reduce a future network communication time for the communication straggler to send a future result of the distributed deep learning training on a new batch of training data in response to a centralized parameter server determining that the learner is the communication straggler, wherein modifying the communication aspect comprises compressing the future result before sending the future result to the centralized parameter server, wherein the future result is compressed using a compression rate based on a network communication time of the communication straggler.

8. The computer program product of claim 7, further comprising:
   determining a plurality of network communication times representing an amount of time between:
      a plurality of batch end times; and
      when the centralized parameter server receives a plurality of results; and
   identifying the communication straggler based on the plurality of network communication times and a threshold network communication time.

9. The computer program product of claim 7, further comprising modifying a processing aspect of the communication straggler, wherein modifying the processing aspect comprises:
   determining a size of the new batch of training data; and
   distributing a reduced amount of communication straggler training data to a plurality of remaining learners for performing the distributed deep learning training.

10. The computer program product of claim 9, further comprising:
    performing the distributed deep learning training on the new batch of training data by the communication straggler; and
    performing the distributed deep learning training on the reduced amount of communication straggler training data by the plurality of remaining learners.

11. The computer program product of claim 7, further comprising modifying a processing aspect of the communication straggler, wherein modifying the processing aspect comprises increasing a frequency rate of a computational processor of the communication straggler.

12. The computer program product of claim 7, further comprising:
    performing the distributed deep learning training on a plurality of batches of training data using a plurality of learners;
    determining the plurality of training times representing an amount of time between:
       when the plurality of learners begins generating a corresponding plurality of results for the centralized parameter server for the distributed deep learning training; and
       when the plurality of learners sends the plurality of results to the centralized parameter server; and
    determining a plurality of network communication times representing an amount of time between:
       when a plurality of learners sends the plurality of results to the centralized parameter server for the distributed deep learning training; and
       when the centralized parameter server receives the plurality of results.

13. A system comprising:
    a computer processing circuit; and
    a computer-readable storage medium storing instructions, which, when executed by the computer processing circuit, are configured to cause the computer processing circuit to perform a method comprising:
    performing distributed deep learning training on a batch of training data;
    determining a training time representing an amount of time between:
       a beginning batch time for a learner; and
       an end batch time for the learner;
    determining that the learner is a communication straggler by determining that the training time exceeds a predetermined threshold time; and
    modifying a communication aspect of the learner to reduce a future network communication time for the communication straggler to send a future result of the distributed deep learning training on a new batch of training data in response to a centralized parameter server determining that the learner is the communication straggler, wherein modifying the communication aspect comprises compressing the future result before sending the future result to the centralized parameter server, wherein the future result is compressed using a compression rate based on a network communication time of the communication straggler.

14. The system of claim 13, the method further comprising:
    determining a plurality of network communication times representing an amount of time between:
       a plurality of batch end times; and
       a plurality of times when the centralized parameter server receives a plurality of results; and
    identifying the communication straggler based on the plurality of network communication times and a threshold network communication time.

* * * * *